April 23, 1957 C. O. FINN 2,789,399
METHOD AND MEANS FOR PROTECTING SOIL SLOPES, WATER RUNS,
GULCHES, DITCHES AND THE LIKE, BY SEEDING AND COVERING
Filed Jan. 3, 1955 3 Sheets-Sheet 1

INVENTOR.
CHARLES O. FINN
BY
Zugelter & Zugelter
Attys.

INVENTOR.
CHARLES O. FINN
BY
Zugelter & Zugelter
Attys.

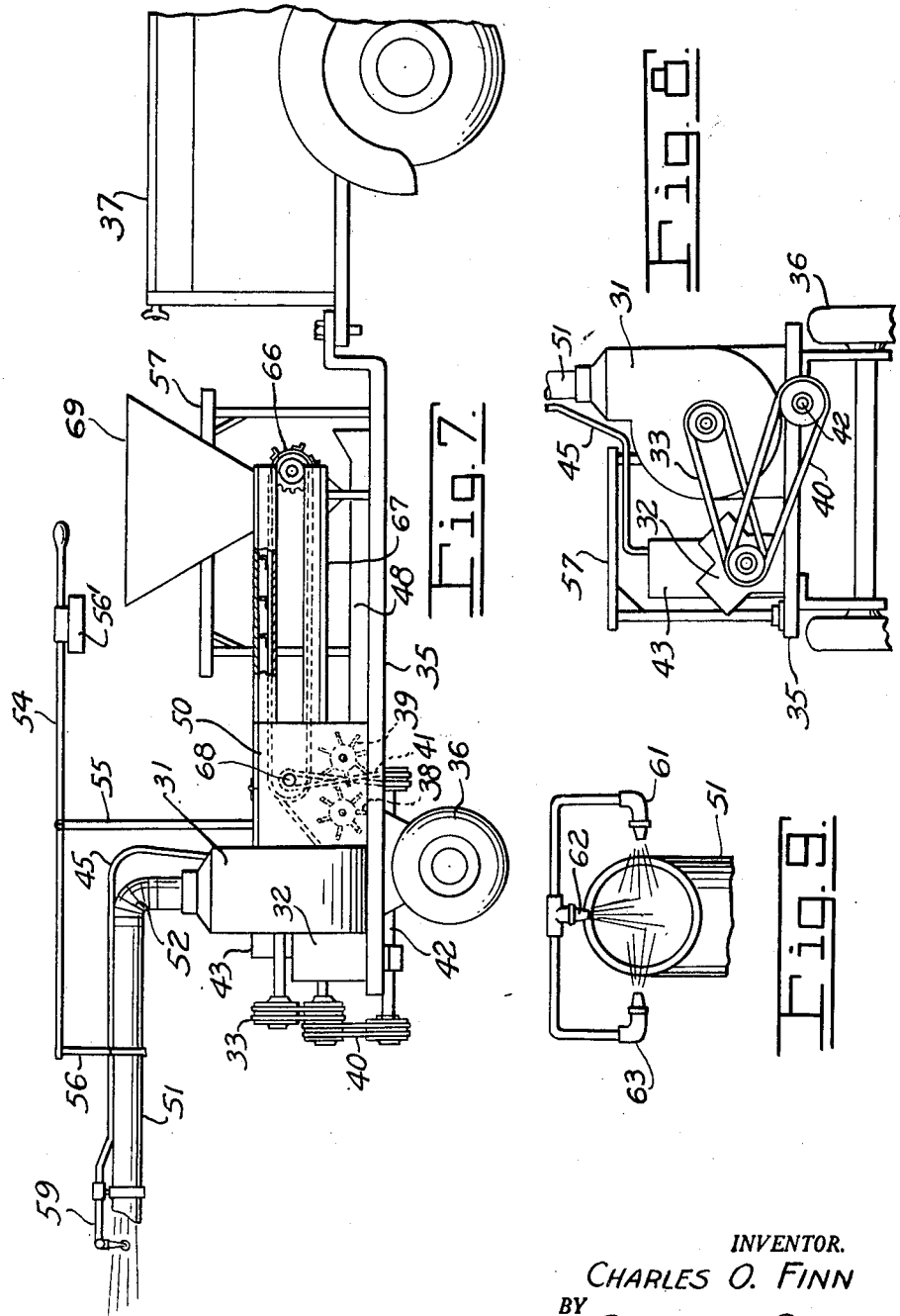

United States Patent Office 2,789,399
Patented Apr. 23, 1957

2,789,399

METHOD AND MEANS FOR PROTECTING SOIL SLOPES, WATER RUNS, GULCHES, DITCHES AND THE LIKE BY SEEDING AND COVERING

Charles O. Finn, Cincinnati, Ohio

Application January 3, 1955, Serial No. 479,524

7 Claims. (Cl. 47—58)

This invention relates to a method of protecting soil, slopes, water runs, gulches, ditches, etc., from water erosion, to coverings for the surfaces of such slopes, water runs, gulches, ditches, etc., and to a method of seeding slopes, water runs, gulches, etc., and protecting the seeded areas from water erosion. This application is a continuation-in-part of my co-pending applications Serial Nos. 373,563 filed Aug. 11, 1953, and 416,812 filed March 17, 1954.

The protection of soil along highways where bare slopes and water runs results from grading and earth removal, the problem of protecting such slopes, and water runs is a serious one and has entailed considerable expense. Soil reclamation and the construction of irrigation ditches also involve similar problems and staggering expense.

An object of this invention is to provide a method of laying down, on the surfaces to be protected from erosion, a protective cover of fibre, such as straw for example, in in which the fibres of the cover are secured to each other by an adhesive spotted on the surface thereof.

Another object is to seed the surfaces either before or after the fibre cover or mat has been laid down, and then cover the mat with a porous layer composed of a mixture of granular material such as sand, and an adhesive, such as asphalt, in amount sufficient to cause the granules to adhere to each other and to the fibre mat the porous layer forming a run-off surface for water while the seed germinates the porous layer permitting the blades of grass to grow through the same.

Heretofore water runs have been formed of concrete and from sod. Concrete is more expensive than sod and the cost of sod, as of the time of filing this application, ranges from about 86 cents to $1.50 per square yard, depending upon the rate at which the available supply of sod dwindles.

According to the method of this invention, slopes and surfaces of water runs can be seeded and protected by a fibrous mat which in turn is covered by a layer of granular material, such as sand and adhesive, for approximately 40 cents to 50 cents per square yard.

Another object of this invention is to provide an erosion-prevention cover for water runs, gullies, gulches, ditches and the like, that comprises a mat of fibres secured together with adhesive spotted on the surface of the fibres and a layer of granular material, such as sand, bonded together and to the fibres by means of an adhesive.

In regions where soil irrigation is practiced, the cost of building irrigation ditches which supply the areas to be irrigated, are expensive as presently constructed of concrete or other building materials. To materially reduce the cost of constructing irrigation ditches and to decrease the time required to cover the surfaces of the walls and the bottoms of such ditches, it is an object of the invention to cover the ditch surfaces with a mat of fibres secured together by adhesive spotted on the surface thereof, and then to cover the mat with a layer composed of Portland cement, sand and adhesive, the adhesive containing water in amount sufficient to set the cement and the adhesive causing the cement and sand to adhere to each other and to the mat.

Other objects of the invention will in part be apparent and will in part be obvious to those of ordinary skill in the art to which the invention pertains from the following description taken in conjunction with the accompanying drawings.

In the drawings:

Figure 1 is a more or less diagrammatic view of a slope in which a relatively deep gully has been cut by run-off water;

Fig. 2 is a view of the same area illustrated by Fig. 1 in which the gully has been filled in with dirt and the surface sloping towards the gully as well as the surface corresponding to that in which the gully had been cut in Fig. 1, has been covered by a mat of fibres having coated on the surface thereof spots of adhesive, and the fibre mat has been covered by a layer of granular material and adhesive in the area where the sloping surfaces had converged to form the water run;

Fig. 7 is a view in side elevation, illustrating schematically apparatus for performing the method and producing the soil surface coverings;

Fig. 8 is an end view of the apparatus shown in Fig. 7; and

Fig. 9 is a view looking in the direction of arrows IX—IX of Fig. 7.

Figure 1:
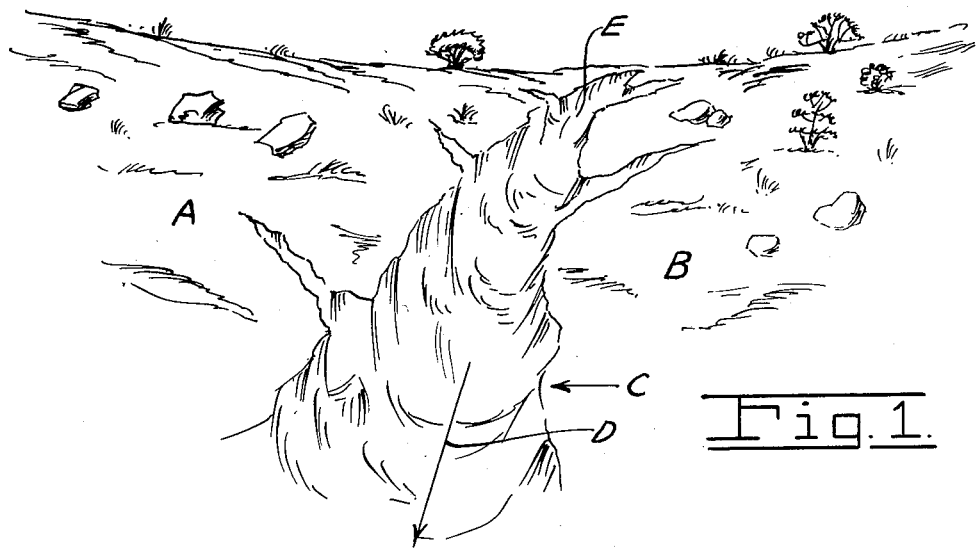

In Fig. 1 of the drawings soil areas A and B are illustrated which slope toward each other to form a run-off area C. The run-off area C, as illustrated, slopes in the direction of arrow D. The slopes A and B were uncovered, that is the soil was not protected by a growth of grass or other covering with the result that a ditch or gully E was washed out by the water. In the particular illustration of Fig. 1 the water wash was about six feet deep.

Figure 2:
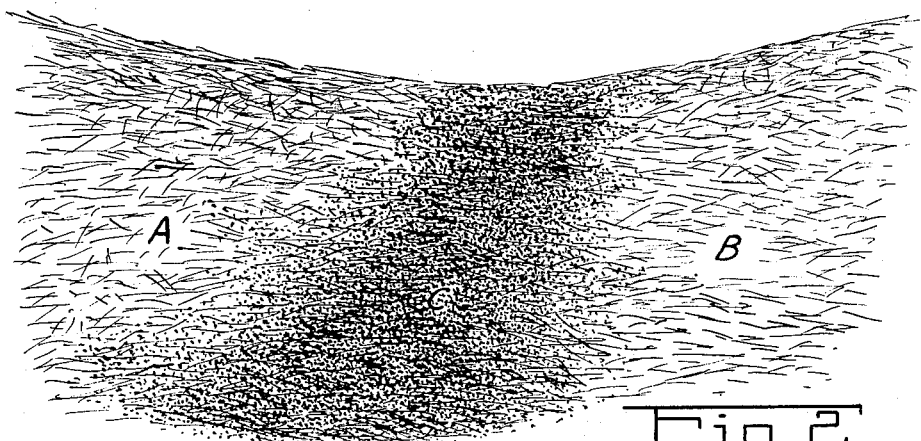
Figure 3:
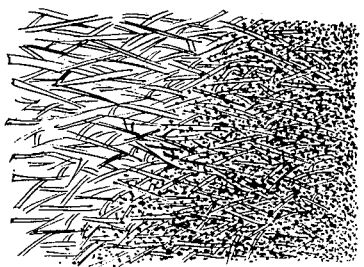
Fig. 3 is an enlarged view of the fibre mat shown in Fig. 2 including the layer of granular material and adhesive.

Figure 2 illustrates the same areas as illustrated in Fig. 1 except that the ditch E had been filled in with dirt and then the entire areas A, B and C seeded and fertilized, following which a mat of fibres, such as straw fibres of substantially uniform length of the order of four to eight inches, were blown over the areas. In distributing the straw fibres over the areas they were brought in contact with a fog or mist of adhesive such as asphalt, having a viscosity of the order of No. 10 motor oil. The straw was blown over the areas A, B and that corresponding to the ditch E of Fig. 1. Into the stream of air containing the straw fibres, a fog or mist of asphalt was injected to provide spots of adhesive on the fibres, causing them to adhere to each other when coming to rest on the soil areas.

To further protect the area where the ditch E had been washed, granular material such as dry sand, was blown over that area including portions of the areas A and B. As the sand was being blown a fog or mist of asphalt was sprayed into its carrier or stream, so that the granular particles were coated or spotted with an adhesive which caused them to adhere and form a layer on top of the straw mat. By providing a fibre mat as a cover for the slopes and as a base for the sand and asphalt cover over the run-off area C, the rain water will run off area C without washing away the seed or eroding the slopes or the run-off slope C. The layer of sand and asphalt is porous so that the grass can grow up through it after the seed has germinated.

Figure 4:
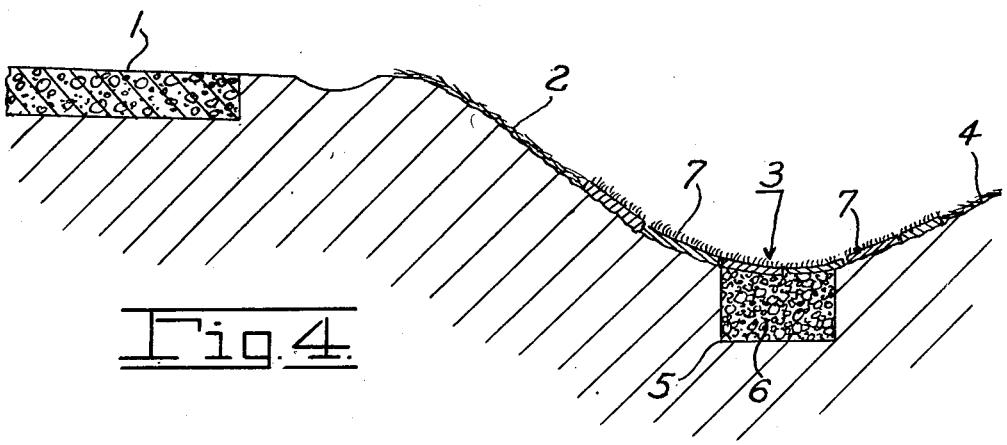
Fig. 4 is a more or less diagrammatic view of a highway and the slope along the side thereof showing a water run which has been covered with sod.

In Fig. 4 is shown in section a roadbed 1 having a slope 2 running down to a run-off collector 3. The ground slopes upwardly from collector 3 as indicated at 4. The arrangement shown in Fig. 4 is one in which a ditch 5 is dug under the collector 3, which is filled with gravel 6 and covered with pieces of sod 7. Sodding is expensive and at present day prices varies from 86 cents to $1.50 per square yard. According to conventional methods the slopes 2 and 4 would be seeded and covered with straw which is held down by means of twine and other means.

Figure 5:
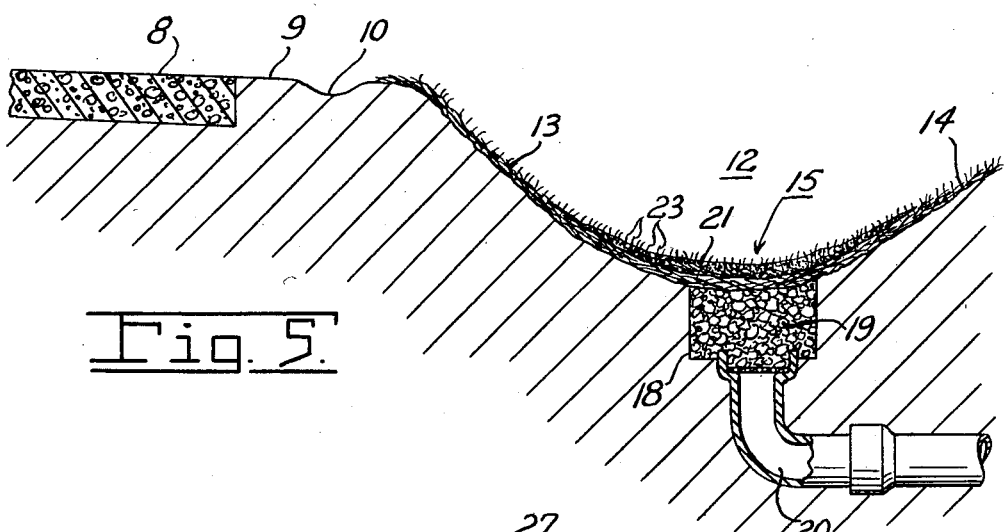
Fig. 5 is a view similar to Fig. 4, showing the slopes of the embankment along the highway covered in accordance with this invention, the valley of the slope which forms the water run being also covered with a layer of porous granular material which has been bonded with adhesive.

Figure 5 is a view similar to that shown in Fig. 4. The roadbed is indicated at 8 and the berm at 9, the latter having a gutter 10. Along the side of the roadbed 8 is a ditch 12 having relatively steep slopes 13 and 14 on either side that converge to form a trough or water run 15. In accordance with this invention the slopes 13 and 14 are covered by a straw mat in which the individual particles of straw are secured to each other by means of adhesive such as asphalt spotted on the surface of the straws. The straw mat extends over the run-off ditch or gutter 15. Under the area 15 may be a ditch 18 which is filled with gravel or crushed stone 19. Water may trickle through that gravel 19 and be led off by a drain 20 to a catch basin not shown.

In order to provide a good run-off surface for the straw mat that extends across the ditch 15, the straw mat is covered with a layer 21 consisting of insoluble granular material such as sand, admixed with adhesive such as asphalt. In practicing the method, the gravel is blown by means of a blower along the valley or ditch 15 while being admixed with asphalt which is blown into the sand stream as a fog or mist. The sand layer can be built up to any desired thickness and, because of the asphalt, will be held firmly to the mat base. The sand layer which is tacked on with adhesive is porous so that as the seed sprouts, the blades of grass may grow up through it as indicated at 23.

Figure 6:
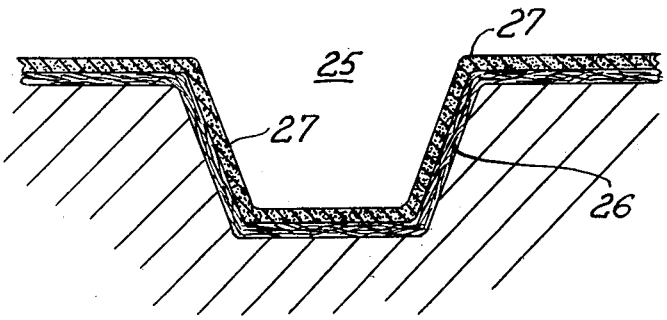
Fig. 6 is a view in section of an irrigation ditch, the sides and bottom of which have been covered in accordance with the method of the invention and by means of the coverings thereof.

In Fig. 6 is illustrated an irrigation ditch 25, the sides and bottom of which are covered by a fibre mat 26, the fibres of which are secured together by means of adhesive such as asphalt spotted on the surface of the fibres, and a layer 27 composed of a mixture of sand or other particulate material, Portland cement and an asphalt emulsion which contains sufficient water to cause the cement to set and which also contains enough adhesive asphalt to cause the particles of set cement and sand to adhere to the fibre mat 26.

The straw mat 26 may be laid down by blowing straw over the surfaces to be covered while at the same time blowing a fog or mist of asphalt into the air stream carrying the straw.

The layer 27 is also placed by blowing a dry mixture of Portland cement and sand by means of a blower over the surfaces of the sides and bottom of the ditch while at the same time admixing with the cement and sand, the asphalt emulsion. The asphalt emulsion is blown into the stream of sand and cement which is carried by the air as a vehicle. In this manner the particles of sand and cement are coated with this asphalt emulsion. The cement takes up the water from the emulsion causing it to set and form a relatively hard compact surface with the sand. The asphaltic component of the emulsion causes the sand and cement particles to adhere firmly to the straw mat 26. Irrigation ditches may be covered by an erosion resistant covering in the manner indicated in Fig. 6 at a relatively low cost. Furthermore, the coverings may be applied much more quickly than is the case where the walls and bottom of the irrigation ditches are constructed of concrete or other material.

The method is also applicable to the covering of earthen dams to protect the slopes thereof from erosion and washing during the period when seed is germinating and it protects those surfaces until the grass has had time to develop a firm sod. The fibre mat 26 as well as the layer of sand and emulsion, or sand, cement and emulsion, provides further protection to the straw mat and the underlying soil against erosion. It is therefore possible to cover large areas of soil which are subjected to either water erosion or wind erosion or both, economically and at a high rate of coverage per day.

In Figures 7, 8 and 9 apparatus is shown by means of which the method of the invention may be practiced and by means of which the coverings for the soil areas may be formed in situ.

The apparatus illustrated in Fig. 7 comprises a blower 31, provided with an internal combustion engine 32 for driving the same. As shown, the engine is coupled to the blower shaft by means of a belt 33. The blower and the motor are mounted on a chassis 35 having wheels provided with pneumatic tires 36. The chassis 35 may be coupled to a truck or tractor 37.

The device is provided with beaters 38 and 39 that are driven by the motor 32 through belts 40 and 41 through a connecting shaft 42. The chassis 35 is provided with a tank 43 in which asphalt may be carried. The asphalt is supplied by a pump driven by the motor 32 through a hose 45. When the machine is to be used for spreading straw, the straw is moved along in baled form over a slide 48 to the beaters 38 and 39 disposed in a housing 50. The suction of the blower carries the straw into the same and discharges it through a pipe 51 that is connected to the blower by a flexible elbow 52. The pipe 51 may be rotated and raised or lowered about the elbow by means of a lever 54 that is pivoted on a standard 55 and connected by a member 56 to the pipe 51. The lever 54 may be provided with a counterweight 56' and operated by an operator standing on a platform 57.

The hose 45 extends along the pipe 51 and is connected to a distributor 59 near the outer end of the pipe. The distributor 59, as shown in Fig. 9, includes nozzles 61, 62 and 63 which are directed across the path of the straw and air discharging from pipe 51. These nozzles are of such form that the asphalt is reduced to a spray or fog. By means of this spray or fog spots of adhesive are formed on the particles of straw so that when the straw fibres come to rest on the surface of the ground, they adhere to each other and form a mat that stays down upon the ground and resists being dislodged by the wind and rain.

The machine also is provided with a conveyor 66 carried by a frame 67 as shown. The forward end of the frame is pivoted on a shaft 68 supported by the housing 50. The conveyor 66 is provided with a hopper 69 into which granular material such as sand or a mixture of sand and cement may be deposited, and delivered by the conveyor to the blower 31. The sand or other particular material, whether alone or admixed with cement, is blown by the blower through the pipe 51 and discharged into the air in a direction that will cover the areas intended. The asphalt is sprayed by nozzles 61, 62 and 63 into the particulate material discharging from the spout or pipe 51 so that a tacky adhesive substance is coated on the surface of the particles. Thus when the granular material strikes the ground on the areas to be covered, it forms a layer in which the particles are stuck together and to the mat.

If the particulate material includes Portland cement, then the adhesive carried in the tank 43 should be an asphalt emulsion, that is an asphalt emulsion which contains water. The amount of water in the emulsion will be sufficient to cause the Portland cement to set up when it has been lodged on the areas to be covered. By means of the apparatus shown in the drawings the method may be carried out while the apparatus is being transported along the banks and ditches to be covered, with the result that many hundreds of square yards may be covered in an hour's time.

The apparatus illustrated may also be used in forming the walls and bottom of irrigation ditches or in covering large areas which are subject to wind and water erosion.

Having thus described the invention, it will be apparent to those skilled in this art that various modifications and changes may be made in the described and illustrated embodiments without departing from either the spirit or the scope of the invention.

Therefore what is claimed as new and desired to be secured by Letters Patent is:

1. The method of protecting a water run-off bed against erosion, that consists in directing a current of air over the sides and bottom of the bed, simultaneously injecting fibres and a fog of asphalt into the air stream to be carried thereby to the surface of the run-off bed to be covered, said fibres being spotted on the surface with said asphalt and causing them to adhere and form a mat, then directing a stream of air over said mat, injecting into the air stream a granular insoluble material and a mist of asphalt to form on said granules an adhesive coating, whereby a layer of granular material, bonded by adhesive, is laid down on and tacked to the mat.

2. In a method of protecting a water run-off bed against erosion, the steps of forming a fibre mat consisting of fibres having adhesive spotted on the surface thereof to secure the fibres together, and then forming on the surface of the fibre mat a covering of insoluble granular material having on the surface thereof an adhesive which bonds the granules to each other and to the fibre mat.

3. An erosion resistant cover adapted to be formed in place on sloping soil surfaces, gullies, ditches and the like, comprising a mat of fibres having adhesive spotted on the surface thereof for securing the fibres together, and a covering layer on the surface of the mat, comprising insoluble granular material and an adhesive on the surface of the granules, said adhesive bonding the granules to each other and to the mat.

4. A cover for water run-off ditches and soil surfaces that comprises a mat of fibres having adhesive spotted on the surface to hold the fibres together as a mat, and a covering layer on the surface of the mat comprising a mixture of Portland cement, insoluble granular material and an adhesive containing water, on the surface of the cement particles and the granules, the Portland cement and the granules being held as a cohesive mass, capable of forming an erosion resistant surface for ditches and surface-water runs.

5. The method of grass seeding the soil of slopes and water runs for surface water, and at the same time covering the seeded soil with a mat which prevents erosion while the seed is germinating and sprouting, which method consists in seeding the soil areas of the water runs and slopes to be protected, covering said areas with a mat of fibres having adhesive spotted on the surface to secure the fibres together as a mat, and covering the fibre mat with a porous layer of granular material having adhesive on the surfaces of the granules, the adhesive causing the particles to adhere to each other and to the fibre mat, whereby the seeded areas are protected against erosion by run-off water while germinating and sprouting, the mat and the granular layer being sufficiently porous to permit the blades of grass to grow through the same.

6. A method of seeding soil surface areas which are subject to erosion by water and wind that consists in seeding the areas, forming a mat of fibres on the seeded surface, the fibres being spotted with adhesive for securing them together as a mat, spraying a suspension of water, fertilizer, and sand over the mat and then covering portions of the surfaces where water collects and runs off, with a layer composed of insoluble granular material and an adhesive spotted on the surface of the granules which causes the granules to adhere to each other and to the fibre mat and form a porous water run through which grass may grow when the seed has germinated.

7. A cover for the surfaces of a run for surface water draining from soil slopes, comprising a layer of fibres having adhesive spotted on the surface thereof, disposed over the surface of said water run, and a cover layer comprising insoluble granular material, Portland cement and an asphalt emulsion adhesive on the surface of the granular material and the Portland cement, the emulsion containing sufficient water to cause the Portland cement to set and causing the set cement and the granular material to be adhesively secured together and to the fibre mat.

References Cited in the file of this patent

UNITED STATES PATENTS

| | | |
|---|---|---|
| 1,428,808 | Schiefele | Sept. 12, 1922 |
| 1,544,990 | Johnson | July 7, 1925 |
| 1,810,262 | Weber | June 16, 1931 |
| 1,833,154 | Curd | Nov. 24, 1931 |
| 1,882,377 | Whittelsey | Oct. 11, 1932 |
| 1,962,806 | Clapp | June 12, 1934 |
| 2,201,279 | Willing | May 21, 1940 |
| 2,243,857 | Fischer | June 3, 1941 |
| 2,632,979 | Alexander | Mar. 31, 1953 |

FOREIGN PATENTS

| | | |
|---|---|---|
| 261,909 | Germany | July 3, 1913 |